Jan. 4, 1949.  E. E. RUSSELL ET AL  2,458,427

METHOD OF MANUFACTURING RECORD DIES

Filed Dec. 19, 1946

Inventors.
E. E. Russell
M. I. Russell
By
Attorneys.

Patented Jan. 4, 1949

2,458,427

UNITED STATES PATENT OFFICE 2,458,427

METHOD OF MANUFACTURING RECORD DIES

Edward E. Russell and Monica I. Russell, Woodmont, Conn.

Application December 19, 1946, Serial No. 717,186

6 Claims. (Cl. 76—107)

By way of explanation, it might be stated that the method commonly employed in the manufacture of dies used in molding flat discs, such as phonograph records from plastic material, in which a binding material is present and which softens with heat, is to provide steel die plates, and cut or machine channels in their under surfaces, leaving ribs integral with the plates.

Dies when manufactured under this well-known methods, are expensive, especially when the channels are cut in forms other than circular, such as spiral.

It is, therefore, the primary object of the present invention, to provide a method of manufacturing dies, designed for molding flat discs as described, which will appreciably reduce the cost of production of the dies, and will also greatly lessen the time required in manufacturing the dies.

Another object of the invention is to provide a method of constructing dies, which includes the coating of the walls of the channels or passageways of the die plates, protecting the channels against the corrosive action of the steam and water, which is destructive to the machined surfaces of the channels of dies, thereby greatly increasing the life of the finished die.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing

Figure 1:
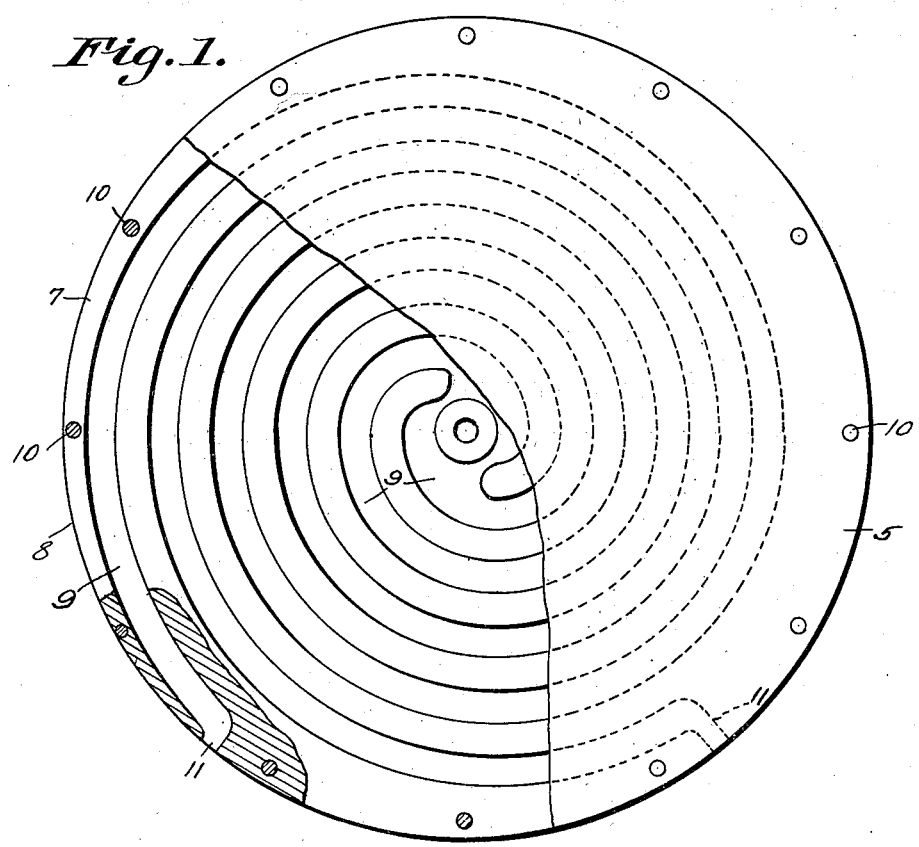
Figure 1 is a plan view of a die which has been constructed in accordance with the present method, a portion of one die plate having been broken away to indicate the channels of the channel plate.
Figure 2:
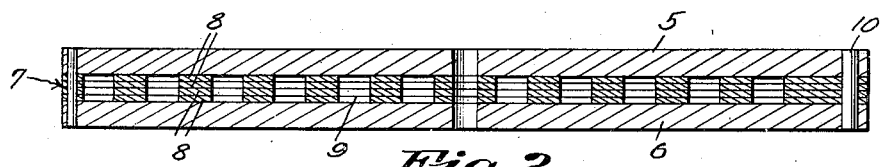
Figure 2 is a transverse sectional view through a die, constructed in accordance with the present method.
Figure 3:
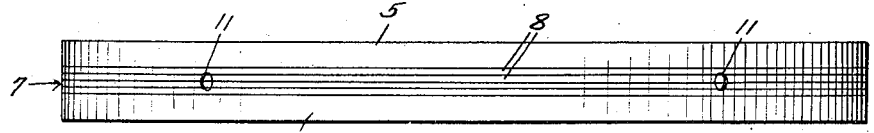
Figure 3 is an edge elevational view of the die.
Figure 4:
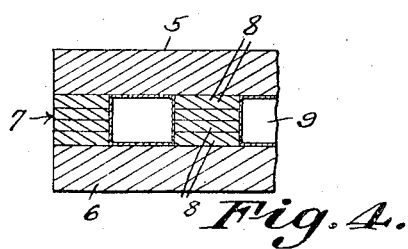
Figure 4 is a fragmental sectional view illustrating the walls of the channels as coated with a protecting medium.

In carrying out the method constituting the subject matter of this invention, I provide an upper die plate 5 and a lower die plate 6, the die plates being spaced apart by means of the channel member 7.

The die plates 5 and 6 are constructed of steel, and the channel member 7 is constructed of identical sections 8 which are superimposed, providing a laminated channel member. By providing a laminated channel member, the sections used in the formation thereof, may be cut by any well-known, fast method, such as cutting by an acetylene torch, electricity, band saw, or the sections may be formed by a stamping or milling machine.

In carrying out our method, the channel member 7 is formed with spiral channels 9 that provide means for circulating steam or other heating medium, or a cooling medium, necessary in the manufacture of the phonograph records from the die.

The channel section is positioned between the die plates 5 and 6, and bolts are provided at 10 for securing the die plates and channel section together.

The die so formed, is placed in a furnace, and subjected to heat at a temperature of approximately 2100°, causing the die plates 5 and 6 to become brazed to the section 7, and the sections 7 brazed to each other.

Openings 11 are now drilled at the outer ends of the spiral channels to establish communication with the atmosphere and afford means whereby a heating medium may be circulated through the channels.

It will, of course, be understood that a cooling medium is also circulated through the channels to cool the die, which is one step of the use of the die in the manufacture of phonograph records.

After the die plates and channel section have been securely brazed together, the ends of the bolts 10 are cut off flush with the outer surfaces of the die plates.

Another important step of the method, is the placing of material such as copper in the channels, so that when the die is subjected to intense heat in the brazing step of the operation, the copper will flow, providing the brazing medium and at the same time coat the walls of the channels, thereby providing a protective coating against the corrosive action of the steam and water, which is destructive to machined surfaces of die channels.

While we have shown and described the channel member constructed of superimposed thin sections, it is to be understood that it is within the scope of the invention to provide a channel section which is constructed of a single piece of metal formed with the channels that extend throughout the thickness of the channel section, the upper and lower die plates forming the top and bottom of the channels.

By following the method described, it will be obvious that the channel section may be rapidly constructed by a simple and well-known method, thereby reducing the cost of production, to a minimum.

What is claimed is:

1. The method of forming dies used in the manufacture of phonograph records, consisting in providing die plates, providing a channel member cutting away portions of the channel member, providing channels extending throughout the entire thickness of the channel members, positioning the channel member between the die plates, securing the channel member between the die plates, placing a brazing medium within the channels and finally, subjecting the connected die plates and channel member to a temperature sufficient to braze the die plates and channel member together.

2. The method of forming dies used in the manufacture of phonograph records, consisting in providing die plates, providing a channel member cutting away portions of the channel member providing channels extending throughout the entire thickness thereof, positioning the channel member between the die plates, closing the tops and bottoms of the channels extending bolts through aligning openings of the channel member and die plates, connecting the die plates and channel member, placing copper material within the channels, subjecting the connected die plates and channel member to a temperature sufficient to melt the copper material within the channels and braze the die plates and channel members together, the copper material coating the walls of the channels.

3. The method of forming dies used in the manufacture of phonograph records, consisting in providing die plates, providing a channel member having channels extending throughout the entire thickness thereof, the channels being annular in formation, positioning the channel member between the die plates, closing the tops and bottoms of the channels extending bolts through openings of the die plates and channel member, connecting the die plates and channel member placing brazing material in the channels, subjecting the connected die plates and channel member to a temperature sufficient to braze the die plates and channel member together, and finally cutting off the ends of the bolts flush with the outer surfaces of the die plates.

4. The method of forming dies used in the manufacture of phonograph records, consisting in providing die plates, providing a channel member by cutting thin sheets of metal forming annular channels, super-posing the plates with the annular channels in registry providing a substantially thick channel member, connecting the die plates and channel member, placing brazing material within the channels and finally subjecting the die plates and channel member to a temperature sufficient to braze the die plates and channel member together.

5. The method of forming dies used in the manufacture of phonograph records, consisting in providing die plates, providing a channel member by cutting thin sheets of metal forming annular channels, superposing the plates with their channels in registry providing a substantially thick channel member, placing a brazing medium within the channels bolting the die plates and channel member together, and finally subjecting the die plates and channel member to a temperature sufficient to braze the die plates and channel member together.

6. The method of forming dies used in the manufacture of phonograph records, consisting in providing die plates, forming a channel member with channels cut throughout the entire thickness of the channel member, positioning the channel member between the die plates, closing the tops and bottoms of the channels, extending bolts through aligning openings of the channel member and die plates, connecting the die plates and channel member, placing brazing material within the channels, subjecting the connected die plates and channel member to a temperature sufficient to melt the brazing material within the channels brazing the die plates and channel members together, the brazing material coating the walls of the channels.

EDWARD E. RUSSELL.
MONICA I. RUSSELL.

REFERENCES CITED

The following references are of record in the file of this patent:

UNITED STATES PATENTS

| Number | Name | Date |
|---|---|---|
| 1,061,258 | Aylsworth et al | May 13, 1913 |
| 1,097,985 | Moore | May 26, 1914 |
| 1,099,349 | Edison | June 9, 1914 |
| 1,504,422 | Bishop | Aug. 12, 1924 |
| 1,546,418 | Stresau | July 21, 1925 |
| 1,571,559 | Smith | Feb. 2, 1926 |
| 1,582,714 | Wells | Apr. 27, 1926 |
| 2,007,301 | Lemieux | July 9, 1935 |
| 2,325,617 | Lysholm et al | Aug. 3, 1943 |